United States Patent [19]

Davis

[11] Patent Number: 4,779,377
[45] Date of Patent: Oct. 25, 1988

[54] PLANT HANGER

[76] Inventor: Carole A. Davis, 834 Black Angus Lane, Huntingdon Valley, Pa. 19006

[21] Appl. No.: 23,667

[22] Filed: Mar. 9, 1987

Related U.S. Application Data

[63] Continuation of Ser. No. 751,955, Jul. 5, 1985, abandoned.

[51] Int. Cl.$^4$ .............................................. A01G 9/02
[52] U.S. Cl. ........................................ 47/67; 248/322; 248/339
[58] Field of Search ......................... 47/67, 71, 82, 83; 248/318, 311.2, 322, 339; 289/16.5; 211/113; D11/148

[56] References Cited

U.S. PATENT DOCUMENTS

| | | | |
|---|---|---|---|
| 3,854,242 | 12/1974 | Gladstein | 47/67 |
| 3,950,637 | 4/1976 | Rodin | 47/67 |
| 4,057,210 | 11/1977 | Wellman | 47/67 |
| 4,102,081 | 7/1978 | Morrow | 47/83 |
| 4,229,904 | 10/1980 | Burton | 47/67 |
| 4,349,172 | 9/1982 | Banks, Jr. | 47/67 |
| 4,440,371 | 4/1984 | Wijsman | 47/67 |

*Primary Examiner*—Robert A. Hafer
*Assistant Examiner*—Kevin G. Rooney
*Attorney, Agent, or Firm*—Karl L. Spivak

[57] ABSTRACT

A plant hanger suitable for attaching to the rim of an upwardly positioned flower pot is disclosed. The plant hanger includes generally a plurality of strong, flexible, similar members, each of which terminates upwardly in an upper pot engaging hook. Each of the plurality of members terminates downwardly in a member interconnector of suitable configuration to retain a lower pot support therein. The plant hanger can be easily connected to an upper positioned pot by engaging rim portions of the upper pot with member connected hooks. When properly installed, the plant hanger member interconnector is positioned below and in axial alignment with the upper positioned pot to receive and support the hanger of a lower positioned pot.

3 Claims, 1 Drawing Sheet

PLANT HANGER

This is a continuation of application Ser. No. 751,955, filed July 5, 1985.

BACKGROUND OF THE INVENTION

1. Field of the Invention

The present invention relates generally to the field of indoor plant hanging devices, and more particularly, is directed to pot hanging device suitable for direct attachment to an above supported flower a pot.

2. Description of the Prior Art

It is known to provide wire hangers for flower pots which utilize a plurality of separate wires for pot hanging purposes. The wires are connected at one end to circumferentially spaced locations about the pot rim and upwardly join together to form a bent hook for hanging from a stationary construction, such as a hook. The pot hanger of U.S. Pat. No. 4,084,779 is typical of this type of design.

In U.S. Pat. No. 3,854,242 there is disclosed a support structure for a base plate wherein a plurality of circumferentially spaced cords are employed to carry the hanging structure. The cords terminate upwardly in S-hooks to readily attach to the rim of an upwardly supported flower pot. U.S. Pat. No. Des. 240,383 shows another type of construction that is suitable for engaging the rim of an overhead container for lower flower pot support purposes.

U.S. Pat. No. 4,170,089 discloses a hanging flower pot which is integrally equipped with a bottom hanger of suitable strength and location to receive and support the hook portion of a lower positioned flower pot hanger. Additionally the upper hanging flower pot is provided with drain openings to allow water from the upper supporting pot to drip or drain into the lower supported flower pot.

In U.S. Pat. No. 4,349,172, there is disclosed a plant pot suspension apparatus wherein a pot suspension disc is carried beneath a hanging flower pot and is provided with a plurality of peripherally positioned notches for receiving a plurality of pot suspension strands which are attached to a lower plant pot in a manner to provide for the suspension of a plurality of plant pots in the same vertical column. Copies of all of the above cited patents are attached hereto and made part hereof.

Despite this prior activity in the field, the need remains to provide a simple, inexpensive and easily used flower pot hanger that is widely adaptable for use with existing flower pots of various configurations.

SUMMARY OF THE INVENTION

The present invention relates generally to the field of hanging flower pots, and more particularly, is directed to a simply constructed and inexpensive suspension device suitable to permit a second flower pot to be supported from a higher positioned first flower pot.

The suspension device or plant hanger of the present invention comprises generally a plurality of thin, strong, flexible interconnected strands or members which are designed to releasably attach to the rim of an upwardly supported flower pot. The plant hanger further includes a sturdy hanger ring or other type of support that is supported below the upper flower pot in a position to receive and support the hook of a lower flower pot. Preferably, the plant hanger members are fabricated of suitable plastic or thin wire and are flexible enough to fit about and to conform to the shape of the upper flower pot. Various member lengths can be provided in order to be usable with upper flower pots of varying sizes.

Each strand or member of the plant hanger terminates upwardly in a bent, generally U-shaped hook of suitable strength and configuration to engage the rim of the upper flower pot in circumferentially spaced locations. The flexible strands bend about the outer periphery of the upper pot as necessary to allow the strand hooks to contact and attach to the upper edge of the upper pot in a secure interengagement. When the plant hanger flexible members and hooks are properly connected to the upper flower pot, the plant hanger ring or support will be substantially axially aligned below the upper pot to thereby provide a convenient attachment location to receive the hook of a hanger connected to a lower supported flower pot. In this manner, a plurality of flower pots may be vertically aligned and supported, one beneath the other, to provide an extremely simple and workable flower pot hanging arrangement.

It is therefore an object of the present invention to provide an improved plant hanger of the type set forth.

It is another object of the present invention to provide a novel plant hanger including a plurality of flexible members which are adaptable for use with flower pots of various configurations.

It is another object of the present invention to provide a novel plant hanger comprising a plurality of interconnected members for attaching to an upper flower pot, individual upper hooks respectively associated with the upper ends of the members and a hanger ring positioned below the member interconnection to receive and support a lower positioned flower pot.

It is another object of the present invention to provide a novel plant hanger comprising a plurality of flexible means to grip an upper positioned flower pot and support means suspended from the flexible means, the support means being positioned below the upper flower pot when the flexible means are in gripping association with the upper pot.

It is another object of the present invention to provide a novel plant hanger that is simple in design, inexpensive in manufacture and trouble-free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

DESCRIPTION OF THE PREFERRED EMBODIMENT OF THE INVENTION

Figure 2:
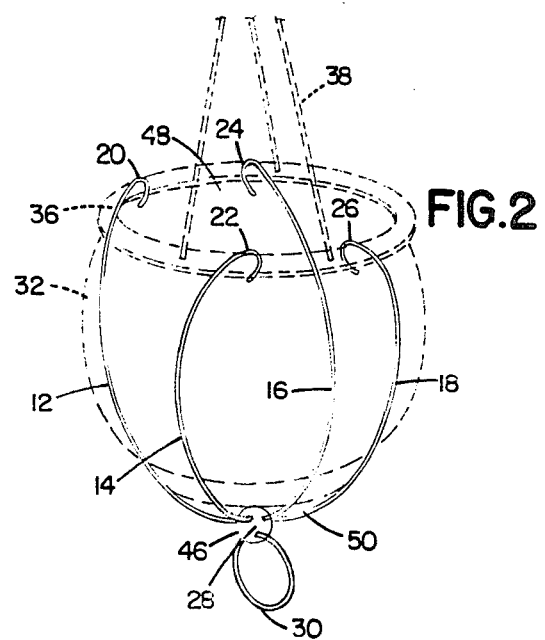
FIG. 2 is a perspective view showing the plant hanger of FIG. 1 in use as applied to an upper pot, the upper pot being shown in phantom lines for purposes of association.

Although specific terms are used in the following description for the sake of clarity, these terms are intended to refer only to the particular structure of the invention selected for illustration in the drawings, and are not intended to define or limit the scope of the invention.

Figure 1:
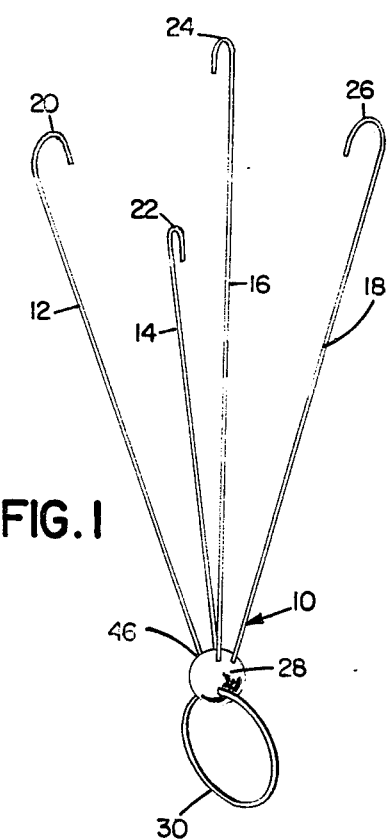
FIG. 1 is a perspective view of a plant hanger constructed in accordance with the teachings of the present invention.

Referring now to the drawings, there is shown in FIGS. 1 and 2 a plant hanger 10 comprising generally a plurality of thin, strong, flexible strands or members 12, 14, 16, 18. The members 12, 14, 16, 18 are bottomly interconnected in a bottom junction 46 and each member terminates respectively upwardly in a bent hook 20, 22, 24, 26, the purpose of which hooks will hereinafter be more fully explained. The strands or members may be fabricated of any elongate thin, strong, flexible material suitable for the purpose, such as, for example, plastic members, wire or the like.

Each member or strand 12, 14, 16, 18 terminates upwardly in a respective bent, generally U-shaped hook 20, 22, 24, 26, which hooks may be formed integrally with the members or may be separately fabricated and then attached securely to the upper ends of the members in known manner in non-releasable interconnections. If separate hooks are utilized, readily available S-shaped hooks could be used for this purpose. The upper hooks 20, 22, 24, 26 should be configured as necessary to fit over and secure to the rim 36 of an above positioned flower pot 32 to thereby facilitate the hanging of a plurality of flower pots in vertical registry, one below another.

The plurality of members or strands 12, 14, 16, 18 terminate downwardly in a common bottom junction 46, which junction may be formed in known manner, for example, by twisting the respective member bottoms together, by employing a suitable adhesive to join the member bottoms, or by employing other known types of member end securing constructions. In the illustrated embodiment, a ball or member interconnector 28 is employed by embedding all of the member bottoms within the ball 28 in a manner to prevent disassociation of the parts. As shown, the member interconnector or ball 28 is also utilized to hold and support a bottom ring 30 or other suitable type of loop. The bottom ring 30 is preferably axially aligned with the upper pot to easily receive the hanger hook of a lower positioned flower pot as hereinafter more fully set forth.

Figure 3:
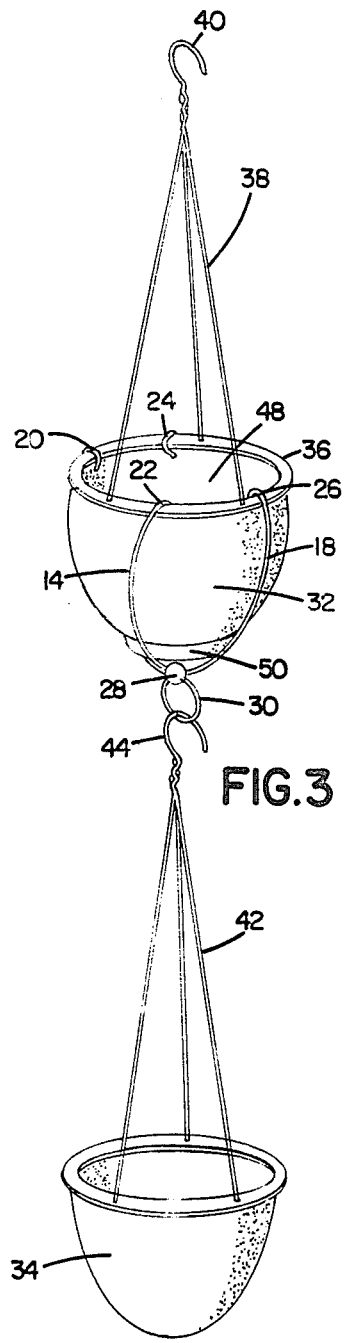
FIG. 3 is a perspective view showing the plant hanger of FIGS. 1 and 2 in use to support a lower positioned flower pot directly from an upper hanging pot.

In order to use the plant hanger 10 of the present invention, as best seen in FIGS. 2 and 3, a first or upper positioned flower pot 32 is secured in a desired position with its top opening 48 facing upwardly. The respective strand or member hooks 20, 22, 24, 26 are then applied over and are engaged upon the rim 36 of the upper pot 32, which rim defines the top opening 48 of the upper positioned pot in the usual manner. As illustrated, the flexibility of the members or strands 12, 14, 16, 18 allows the members to flex as necessary to bend about and conform to the configuration of the outer peripheray of the upper pot 32. It will be noted that when the strand hooks 20, 22, 24, 26 of the plant hanger 10 are secured or engaged upon the upper pot rim 36, the member interconnector 28 and the collector attached ring or support 30 will be positioned below the upper flower pot 32 and in substantially axial alignment therewith. The strands should be fabricated of suitable length, depending upon the dimensions of the upper pot or container 32, to position and support the bottom hanger ring 30 below the bottom 50 of the upper pot 32 without undue looseness.

In use, as shown particularly in FIG. 3, the upper pot 32 is equipped with a conventional hanger 38 which terminates upwardly in a common hook type of carrier 40 for use in hanging the upper pot 32 in a sturdy manner from fixed construction (not shown) in a known type of interconnection. As illustrated, the top opening 48 of the upper flower pot 32 faces upwardly and is defined by the surrounding rim 36. The plant hanger 10 of the present invention is then secured to and about the upper pot 32 by overfitting the rim 36 with the plurality of strand hooks 20, 22, 24, 26. With the strand hooks so engaged, the strands or members 12, 14, 16, 18 flex about the sidewalls of the upper flower pot 32 and terminate downwardly below the bottom 50 of the upper pot, thereby supporting the plant hanger ring 30 in axial alignment below the upper flower pot construction.

In this position, the hanger ring 30 is readily available to receive and support the hanger hook 44 of the conventional pot hanger 42 of the next lower positioned or second flower pot 34. Thus it is seen that a simple, inexpensive and easily installed plant hanger has been provided to enable any number of flower pots to be serially suspended, one from another in a vertically stacked arrangement. By positioning the hanger ring 30 in substantially axially aligned relationship with the longitudinal axis of the upper pot 32, the lower pot 34 will be substantially axially hung with complete freedom of access to permit the lower pot 34 to be readily moved from or connected to the plant hanger 10 when it is associated with an upper positioned flower pot 32.

Although the present invention has been described with reference to the particular embodiments herein set forth, it is understood that the present disclosure has been made only by way of example and that numerous changes in the details of the construction may be resorted to without departing from the spirit and scope of the invention. Thus, the scope of the invention should not be limited by the foregoing specification, but rather, only by the scope of the claims appended hereto.

What is claimed is:

1. A plant hanger for suspending a lower positioned pot from an upper pot of the type having an upper rim comprising a plurality of flexible, interconnected members for attaching the plant hanger to the upper pot, the flexible members each having two ends, a first upper end and a second interconnected end, the flexible members being respectively joined together at their interconnected ends; a rim engaging hook respectively connected to each of the flexible members at the said upper ends thereof, the hooks being adapted to overfit and securely engage the rim of the upper pot; and, a member interconnector encompassing the said interconnected ends of the flexible members, the member interconnector comprising a bottom support, the bottom support being positioned below the said interconnected ends of the flexible members, the bottom support being adapted to support only structure below the said interconnected ends of the flexible members, the bottom support being supported directly from the said upper rim of the upper pot by the said flexible members, the member interconnector being generally solid in composition, the member interconnector comprising an upper half and a lower half, the interconnected ends of the flexible members extending angularly upwardly from the upper half of the member interconnector;

whereby a lower positioned pot can be suspended from the bottom support below the upper pot by engaging a hanger hook of the lower positioned pot with the said bottom support.

2. The plant hanger of claim 1 wherein the bottom support comprises a ring.

3. The plant hanger of claim 1 wherein the member interconnector is generally ball-like in configuration.

* * * * *